(No Model.) 2 Sheets—Sheet 1.
H. B. LYTLE & J. A. McCOY.
COMBINED LIGHTNING ARRESTER AND TEST CONNECTION.
No. 318,571. Patented May 26, 1885.
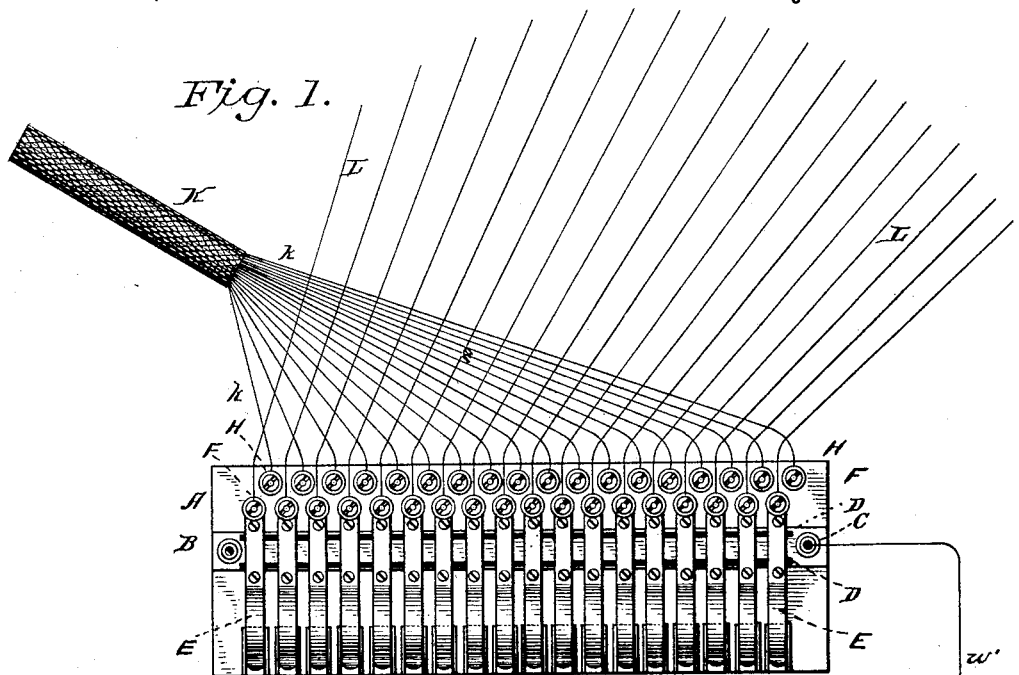
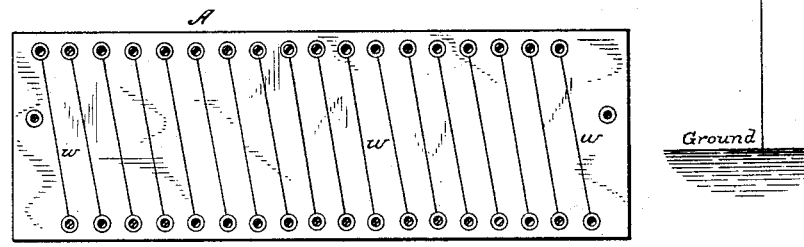
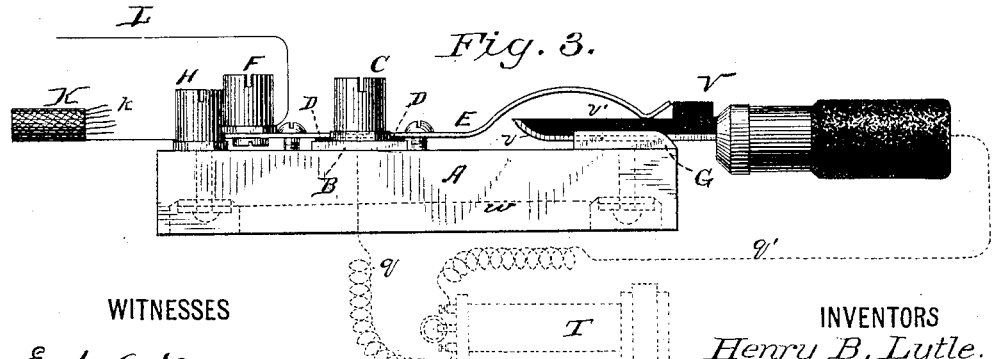
WITNESSES
Ed. A. Newman.
Cel. C. Newman.
INVENTORS
Henry B. Lytle.
John A. Mc. Coy.
By Fred. W. Royce
atty.

(No Model.) 2 Sheets—Sheet 2.
H. B. LYTLE & J. A. McCOY.
COMBINED LIGHTNING ARRESTER AND TEST CONNECTION.
No. 318,571. Patented May 26, 1885.

WITNESSES
Ed. A. Newman.
Al. C. Newman.

INVENTORS
Henry B. Lytle
John A. Mc. Coy.
By Fred. W. Royce,
Atty.

UNITED STATES PATENT OFFICE.

HENRY B. LYTLE, OF BOSTON, MASSACHUSETTS, AND JOHN A. McCOY, OF BALTIMORE, MARYLAND.

COMBINED LIGHTNING-ARRESTER AND TEST-CONNECTION.

SPECIFICATION forming part of Letters Patent No. 318,571, dated May 26, 1885.

Application filed April 30, 1884. (No model.)

*To all whom it may concern:*

Be it known that we, HENRY B. LYTLE and JOHN A. McCOY, citizens of the United States, the former residing at Boston, in the county of Suffolk and State of Massachusetts, and the latter at Baltimore, Maryland, have invented certain new and useful Improvements in Combined Lightning-Arrester and Test-Connection, of which the following is a specification.

This invention relates to an improved device which affords facilities for testing line-wires branching from a common station, and at the same time serves to convey to ground lightning-discharges striking any of the wires, or to cause a rupture of the circuit of any wire receiving an intense stroke of lightning, and thus prevent the lightning-current from being conducted in proximity to other circuits or to instruments connected with such wires.

The invention is especially intended for use in connecting branching wires to the conductors of a telephone-cable leading from a central office, but may be used with slight modification in connection with similarly branching telegraph-wires.

The invention will be readily understood from the following particular description, in connection with the accompanying drawings, in which—

Figure 4:
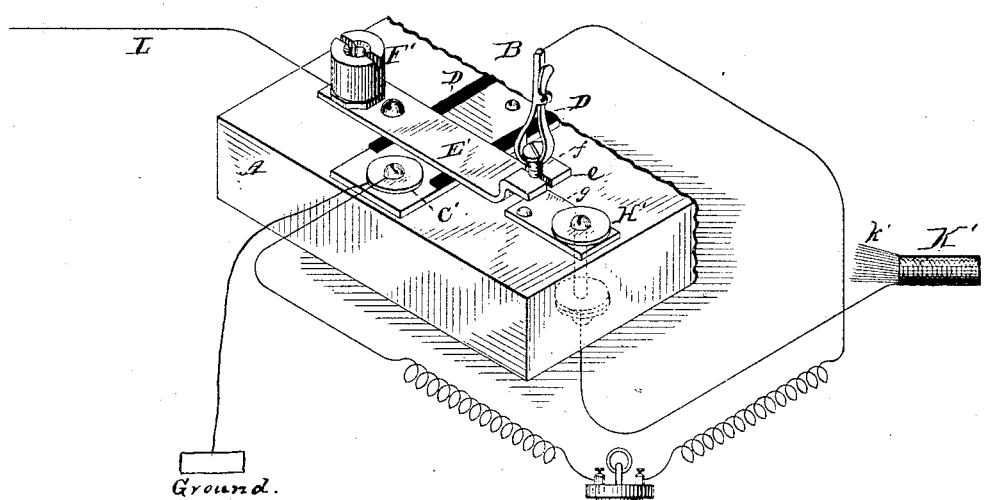
Figure 5:
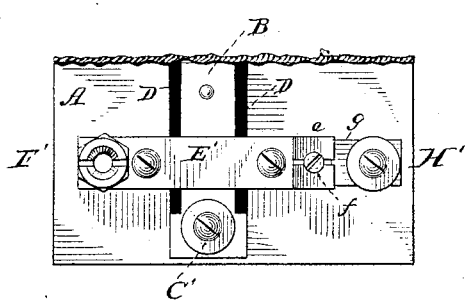
Figure 6:
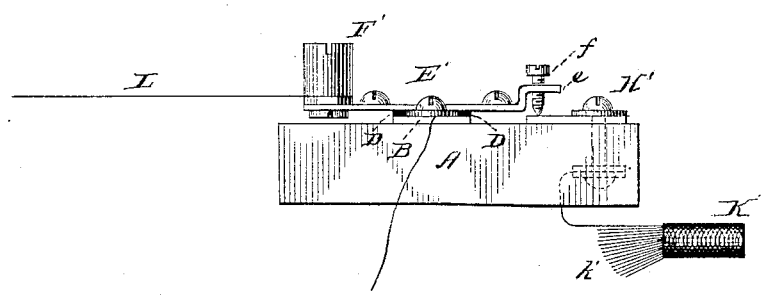

Figure 1 is a front view in elevation of a combined lightning-arrester and series of test-connections constructed according to our invention. Fig. 2 is a rear view of the same. Fig. 3 is an end view, with a telephone shown in dotted lines as connected for testing. Fig. 4 is a perspective view of a portion of a modified apparatus having a telephone connected therewith for testing. Fig. 5 is a front view of a portion of the apparatus of modified construction. Fig. 6 is an end view of the same.

Referring to Fig. 1, the letter A designates a base of non-conducting material—such as well-seasoned wood. Longitudinally upon the front face of this base is secured a strip, B, of metal, having a binding-screw, C, arranged upon one end. Upon the opposite front margins of the metal strip B are arranged thin, narrow, non-conducting slips D D, preferably of hard rubber or mica, and transversely upon these thin slips, and insulated thereby from the metallic strip B, are metal springs E, each having secured to one projecting end a binding-screw, F, while its other end is curved to bear upon a metal shoe, G, secured to the base A. The shoes G are respectively connected with binding-screws H by fine easily-fusible wires w, extending across the back of the base.

The letter K indicates a telephone-cable, which is supposed to lead from a central telephone-office, and has its conductors k connected, respectively, to the binding-screws H, while the branching line-wires L, which are continuations of these cable-wires, respectively, are connected to the binding-screws F of the springs E, so that from each cable-wire electric connection is made to a branching line-wire over a spring, E, shoe G, fusible wire w, and two binding-screws, F H.

From the binding-screw C of the metal strip B a wire, w', leads to earth. The strip B, being the ground-strip of the lightning-arrester, and the distance between it and the springs E being so slight, the lightning-currents, reaching the springs, will readily leap over the intervening space to strip B, and pass thence over wire w' to ground. If, however, a succession of lightning-strokes, or a very powerful stroke, should strike any of the wires, the fine wires w in circuit with such wires would be melted, and the route for the lightning to the central office and through the cable be thus broken. Instead of the fine wires, strips of tin-foil may be used, and when the device is used in connection with telegraph-wires sufficiently large fusible conductors must be used to conduct the current.

In utilizing the apparatus for testing purposes, a telephone, T, may be connected therewith, as shown in Fig. 3. One of the wires, q, of the telephone is connected to the binding-screw C of the ground-wire w', and the other has connected to it a wedge, V, adapted to be inserted between a shoe, G, and the end of a spring, E. One side of the wedge is formed of non-conducting material, v', and the other side is formed of a metal plate, v, with which is connected the wire q' of the telephone. When the wedge is inserted, the shoe G and spring E are insulated from each other, and from that part which is thus brought in contact with the metal plate $v$ connection is made to ground through said plate, wire $q'$, the telephone, wire $q$, and ground-wire $w'$, so that if any subscriber's circuit is found defective a test at the apparatus will show whether the fault be in the cable or that portion of the circuit which branches off therefrom.

A branch wire, L, may be connected to ground through the telephone by turning the wedge so that its metal part $v$ will come in contact with a spring, E.

In the device shown in Figs. 4, 5, and 6 the ground-strip B and its non-conducting slips D D are the same as in Figs. 1, 2, 3; but instead of springs E we use rigid metal cross-plates E', each having one end provided with a binding-screw, F', and its other end bent to form an overhanging bracket, $e$, through which is arranged a screw, $f$, the tip of which is arranged to make or break contact, as desired, with a metal plate, $g$, secured to the base A, and provided with a binding-screw, H'. The conductors $k'$ of the cable K' are connected to the screws H', and the branching line-wire L to the screws F'. In this form of the device the fusible wire is omitted; but otherwise the lightning-arrester acts the same as in the form first described when the screw $f$ is driven into contact with plate $g$.

When it is desired to test a circuit, the screw $f$ in such circuit is run up out of contact with plate $g$, and the telephone T', having one terminal connected with the ground-wire, as shown in Fig. 4, may have its other terminal connected with screws $f$ and H' alternately for testing the circuit in both directions.

It will be observed that when the plug V is arranged for testing through the cable K an easily-fusible wire, $w$, is in the circuit of the wire tested, and will be melted and break circuit in case a lightning-stroke should fall on the wire during the testing. If the plug be turned the other way for testing one of the branching line-wires L, a cross-spring, E, is in circuit, and it and the ground-strip form a lightning-arrester. In whichever direction, therefore, a test is at any time being made, the wire being tested is provided with devices for protecting its connected instruments against lightning.

The combined lightning-arrester and test-connections may be located in any convenient place, and when placed outside of an office—as, for instance, on a pole—may be inclosed in a suitable box or casing in a well-known manner.

We do not limit ourselves to the precise construction shown in the drawings; but

We claim—

1. In a combined lightning-arrester and test-connection, the combination, with two contacting and separable electrodes, of separate lightning-arresting devices connected with each and provided with means for connection to conductors, substantially as and for the purpose set forth.

2. The combined lightning-arrester and test-connections consisting of the non-conducting base, the ground-strip, the metal cross-springs in close proximity to but insulated from said strip, the metal shoes arranged to receive the pressure of said springs, the readily-fusible conductors connected to said shoes, and suitable devices for connecting said readily-fusible conductors to other conductors, substantially as described.

3. The combination, with the combined lightning-arrester and testing connections having the ground-strip and ground-wire, contiguous metallic cross-pieces, and contact-plates therefor, of an electric testing-instrument having one terminal connected with said ground-wire and its other terminal adapted to be connected with either of said metallic cross-pieces or their contact-plates, substantially as described.

In testimony whereof we affix our signatures in the presence of two witnesses.

HENRY B. LYTLE.
JOHN A. McCOY.

Witnesses:
HARRY Y. DAVIS,
FRED W. ROYCE.